Figure 79:
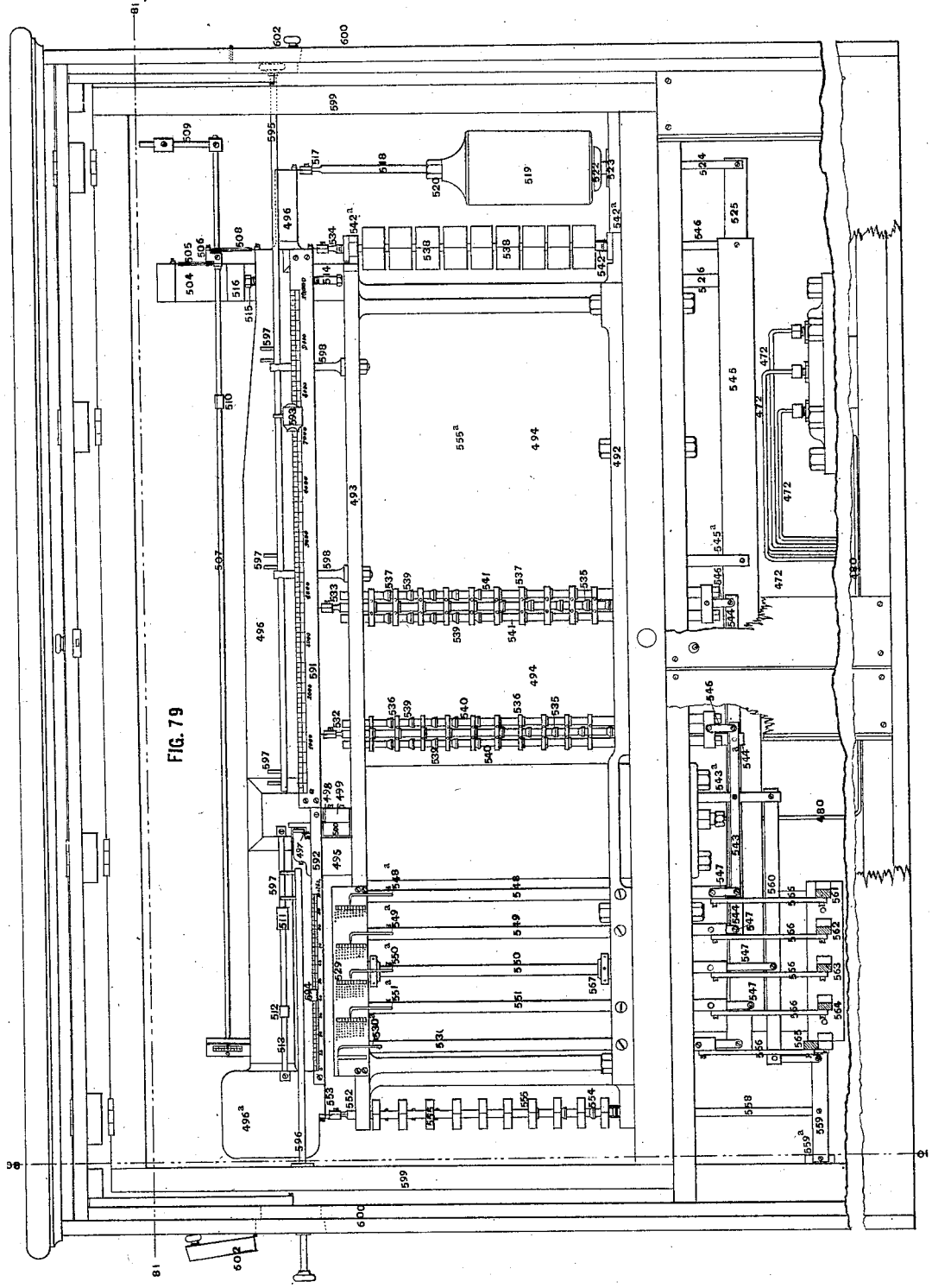

(No Model.) 9 Sheets—Sheet 1.
A. H. EMERY.
WEIGHING MACHINERY.
No. 278,906. Patented June 5, 1883.
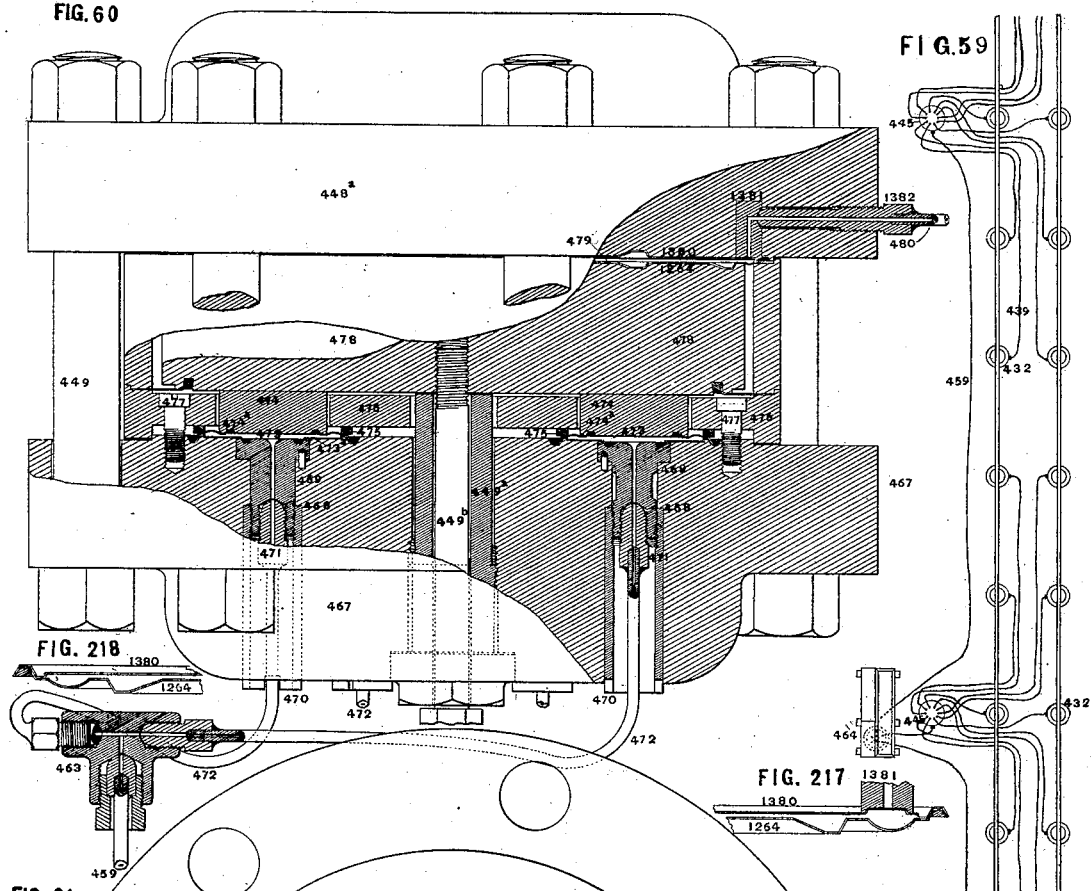
WITNESSES.
Walter Allan
Harry E. Knight
INVENTOR— Albert H. Emery
BY Knight Bros
Attys

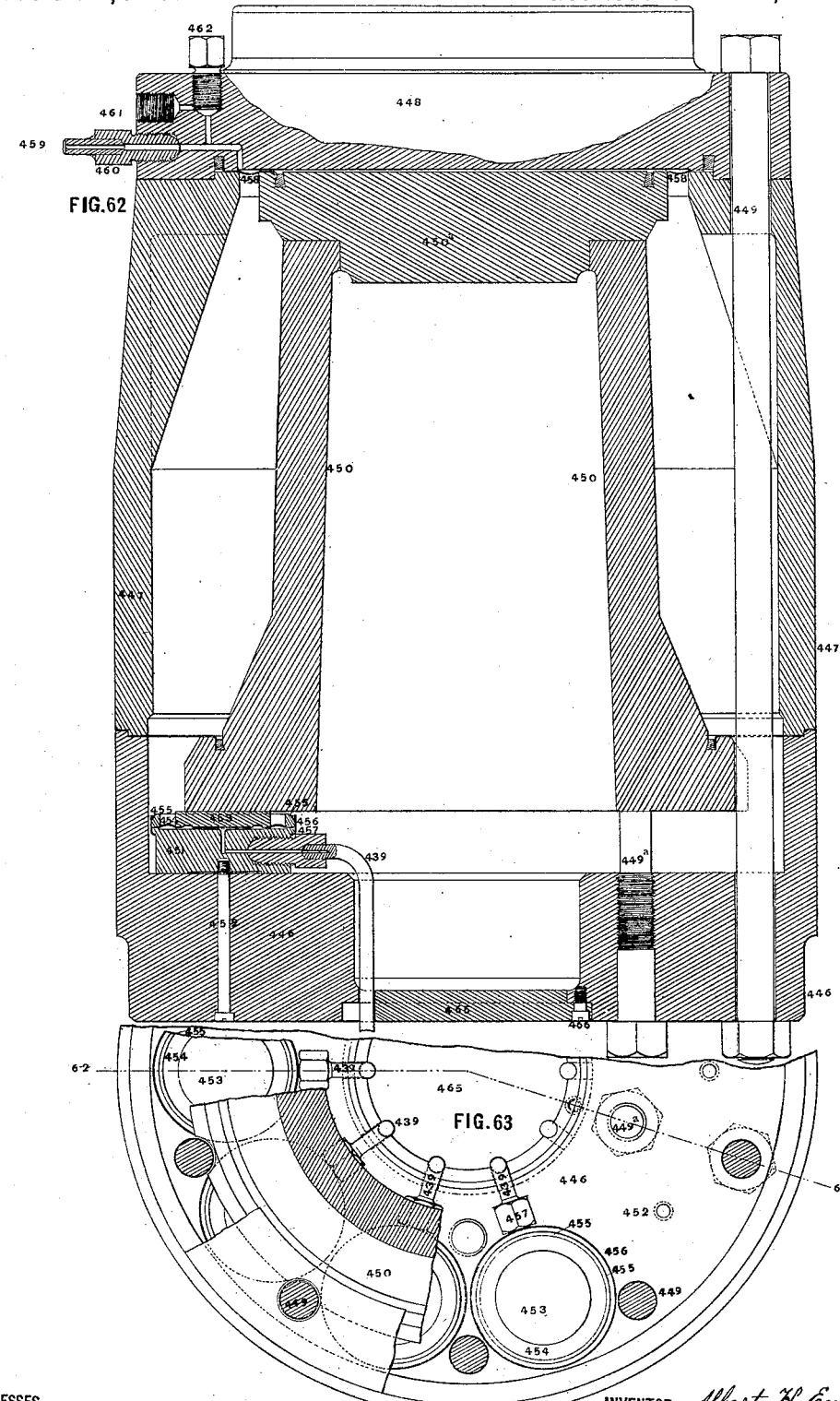

(No Model.) 9 Sheets—Sheet 3.
A. H. EMERY.
WEIGHING MACHINERY.
No. 278,906. Patented June 5, 1883.
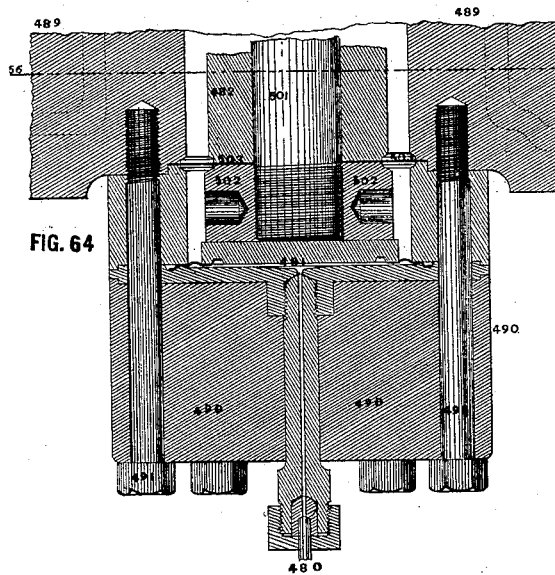
FIG. 64
FIG. 65
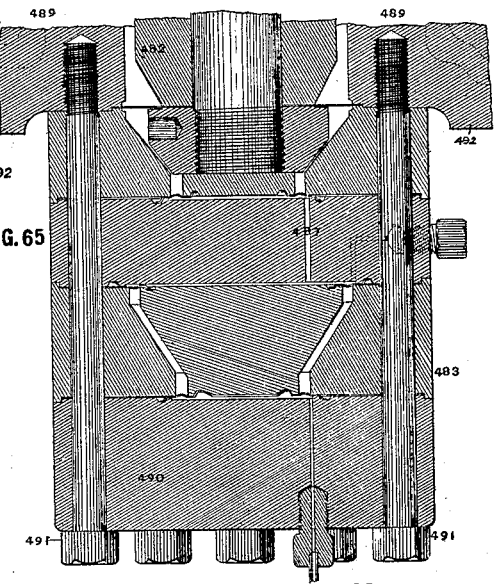
FIG. 66
FIG. 67
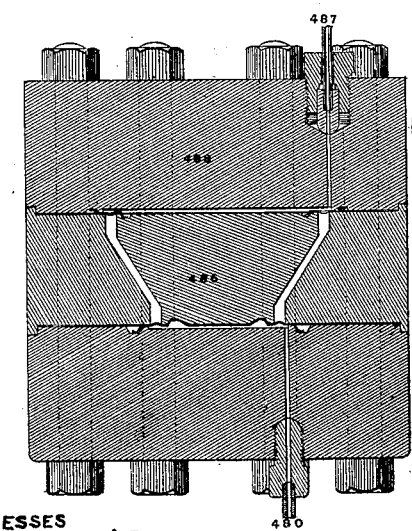
FIG. 68
FIG. 69
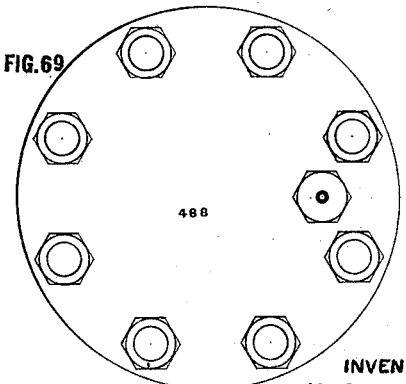
WITNESSES
Walter Allen
Harry E. Knight
INVENTOR
Albert H. Emery
Knight Bros.
N. PETERS. Photo-Lithographer, Washington, D. C.

(No Model.)  9 Sheets—Sheet 4.
A. H. EMERY.
WEIGHING MACHINERY.
No. 278,906.  Patented June 5, 1883.
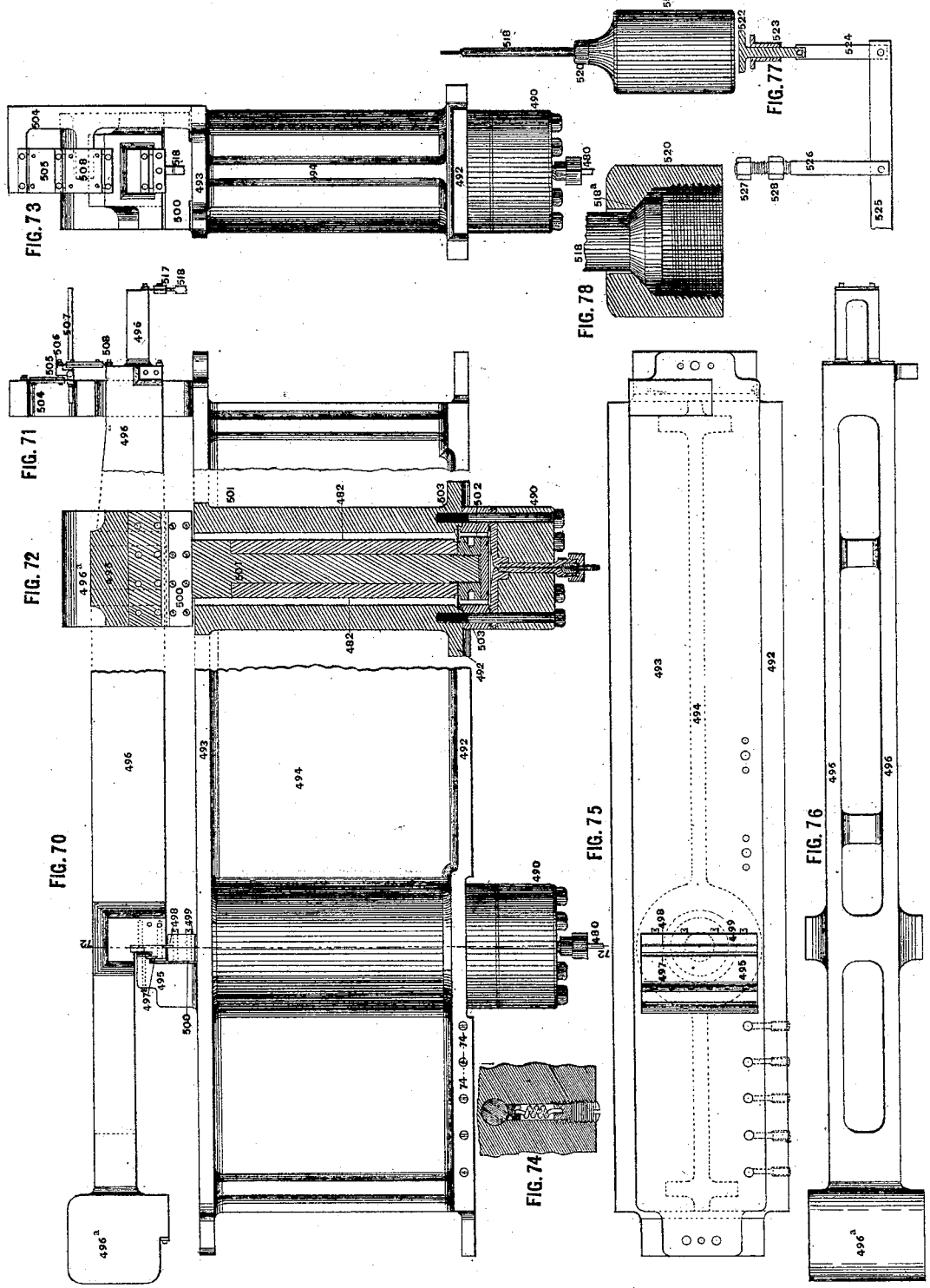

(No Model.) 9 Sheets—Sheet 5.

A. H. EMERY.
WEIGHING MACHINERY.

No. 278,906. Patented June 5, 1883.

WITNESSES.
Walter Allen
Harry E. Knight

INVENTOR - Albert H. Emery
By Knight Bros, attys

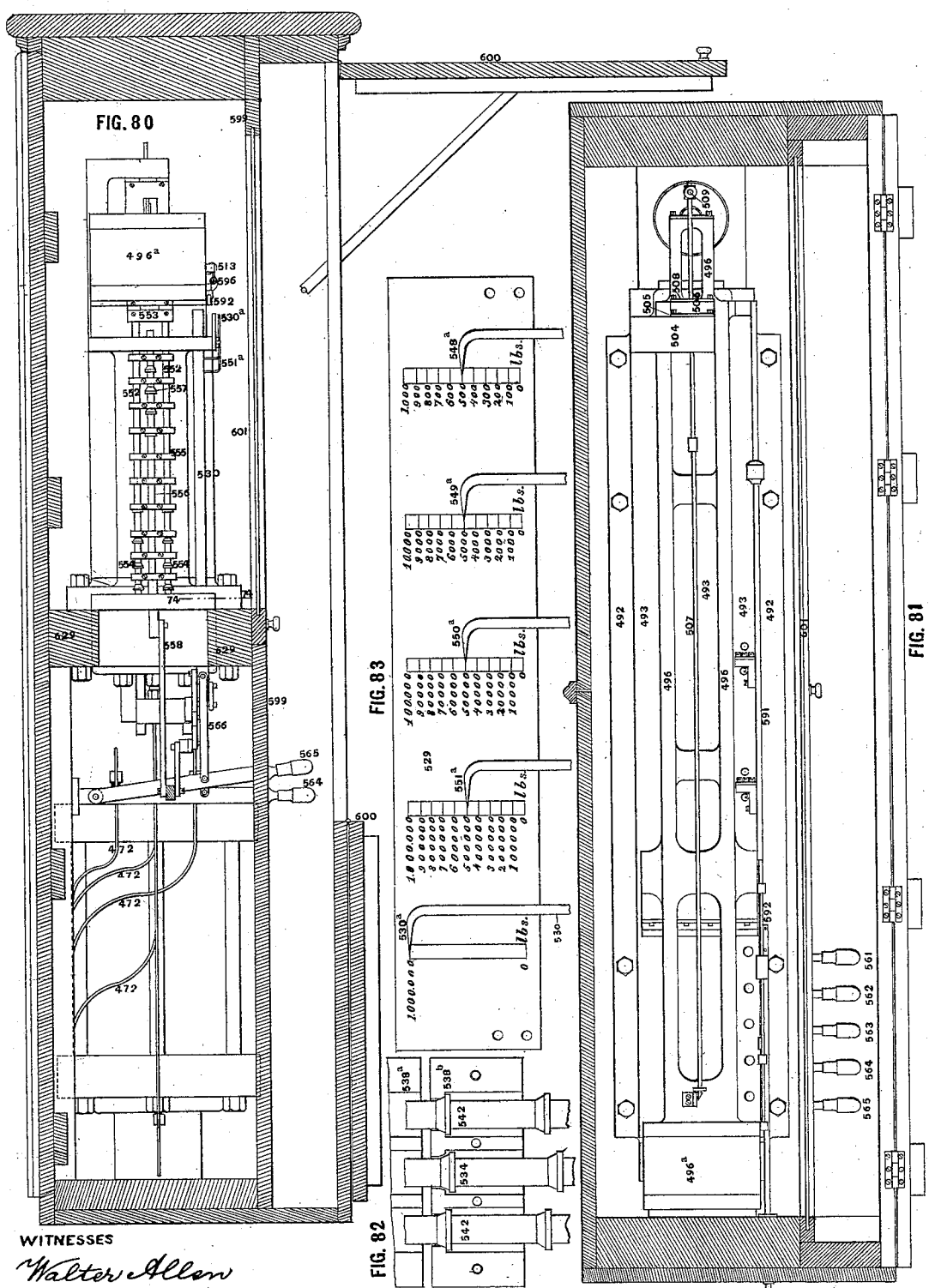

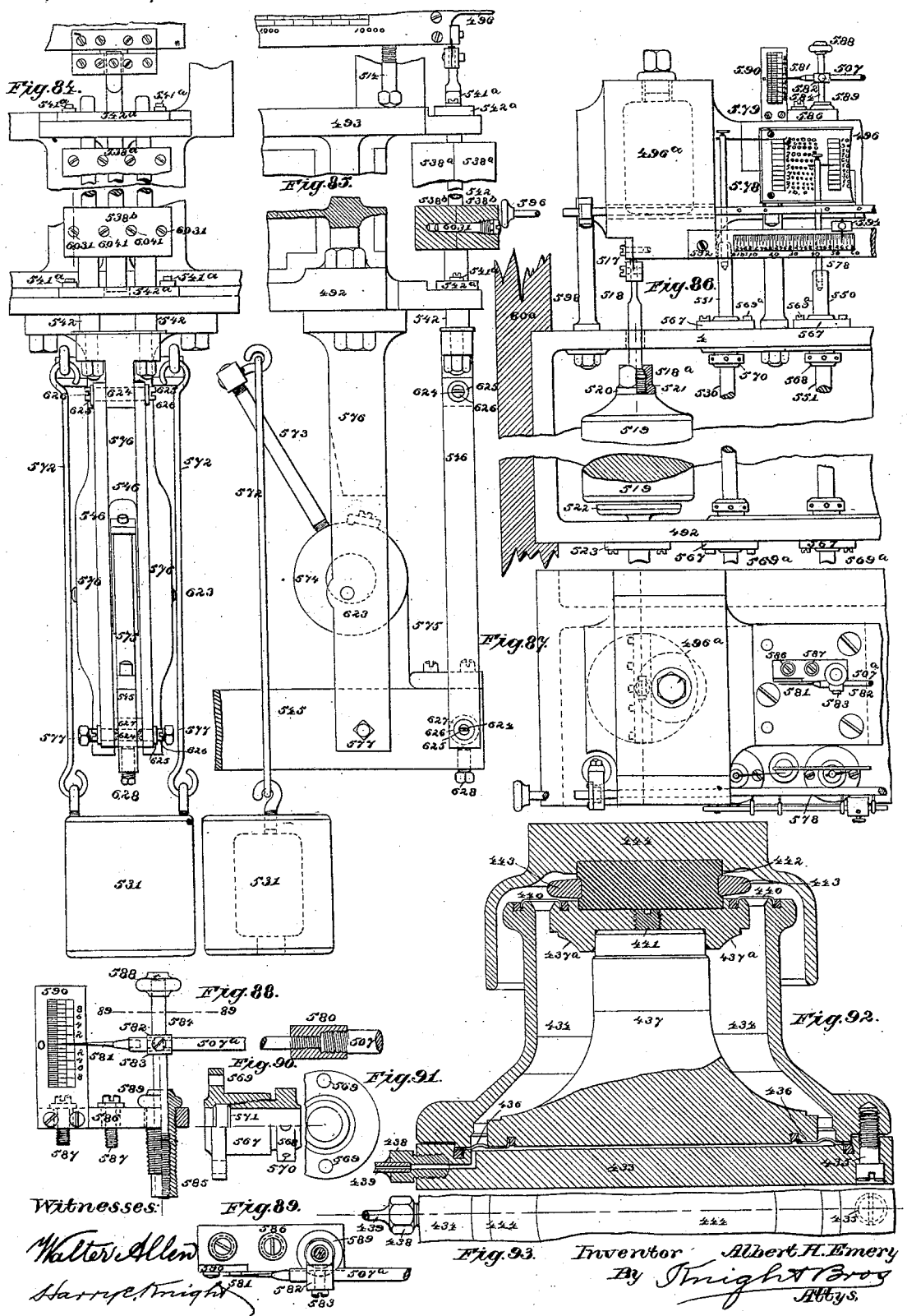

(No Model.)  9 Sheets—Sheet 8.
A. H. EMERY.
WEIGHING MACHINERY.
No. 278,906.  Patented June 5, 1883.
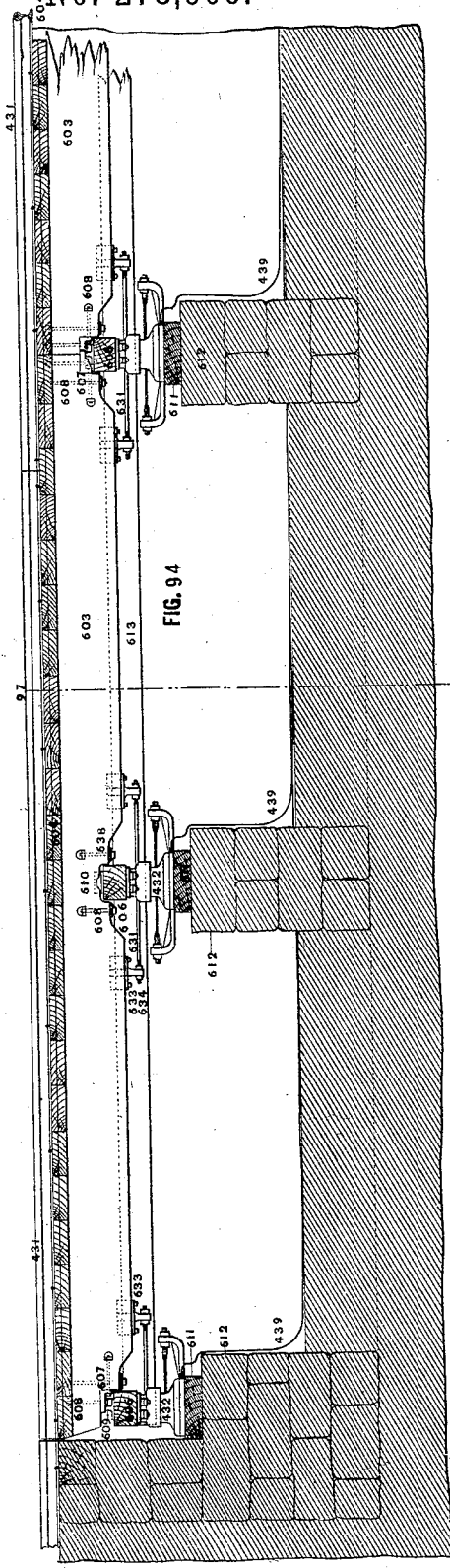
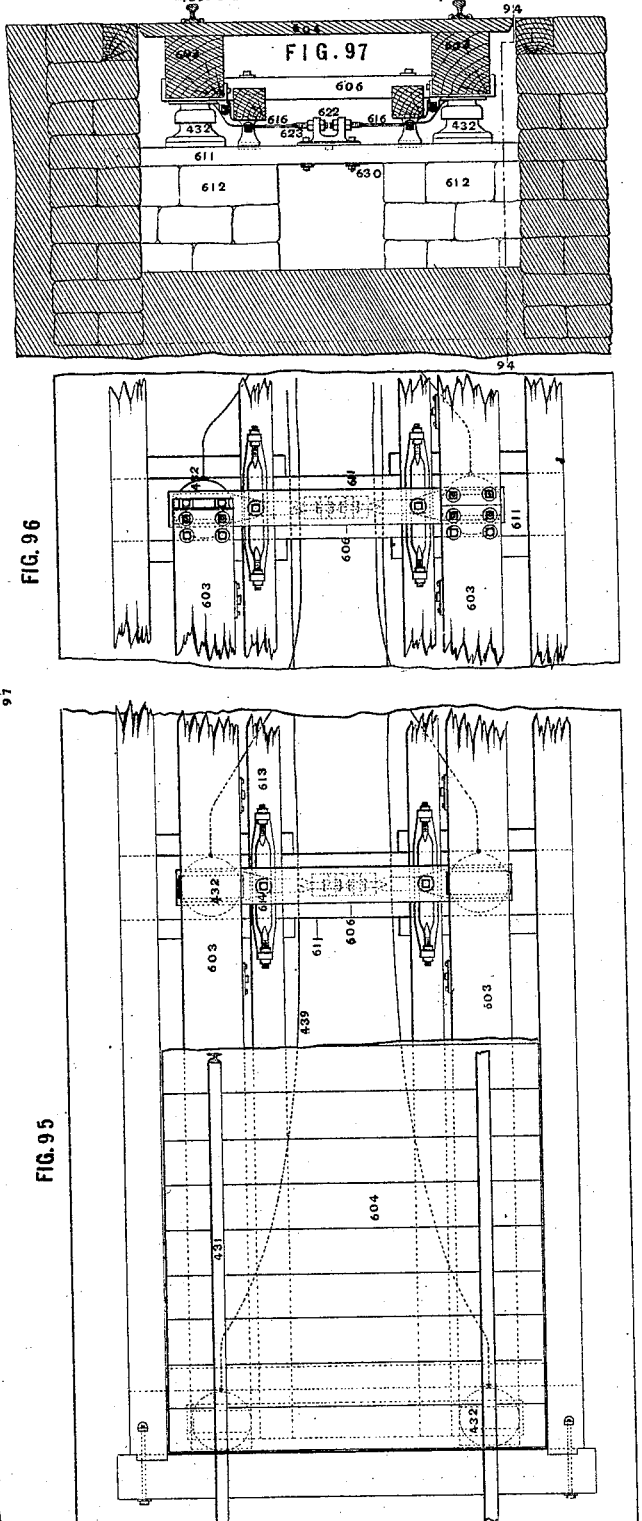

(No Model.) 9 Sheets—Sheet 9.
A. H. EMERY.
WEIGHING MACHINERY.
No. 278,906. Patented June 5, 1883.
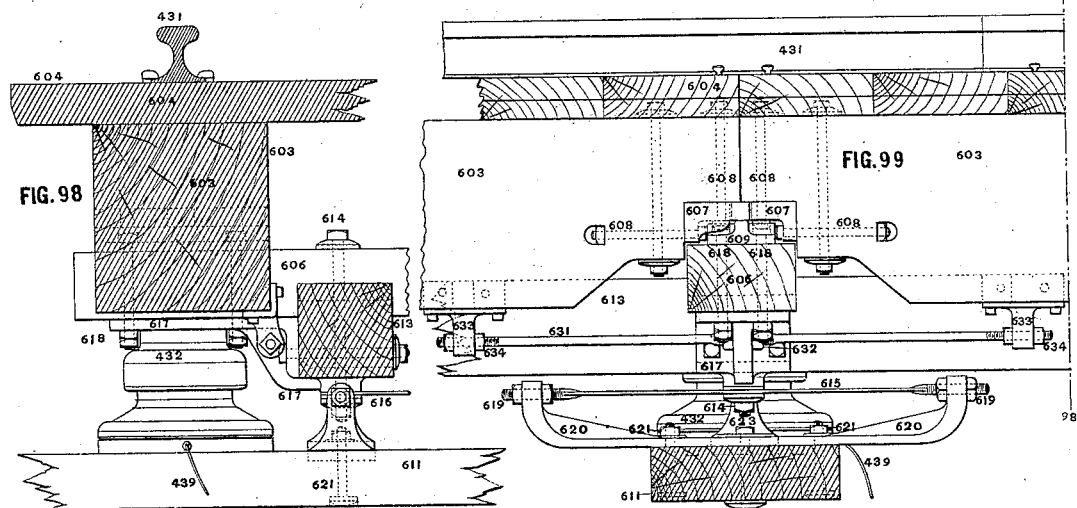
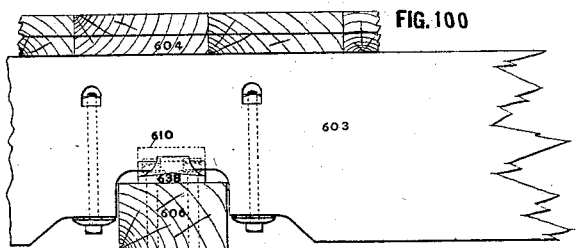
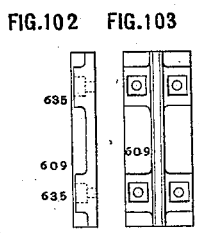
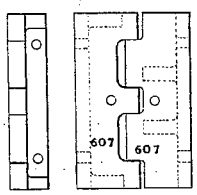
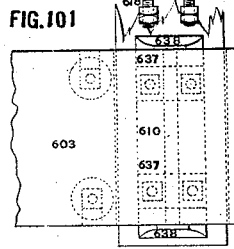
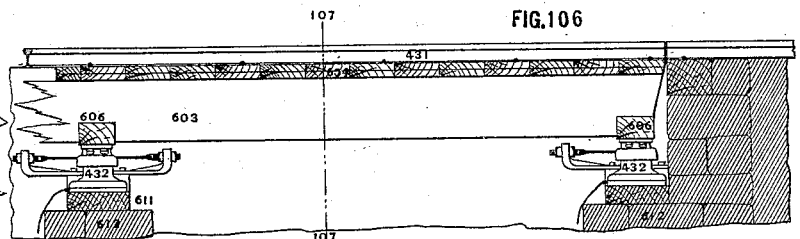
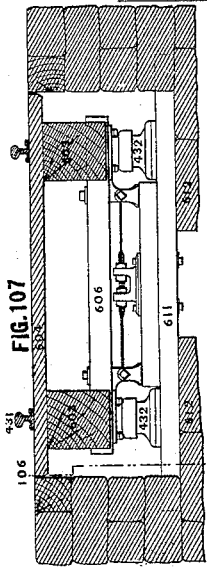
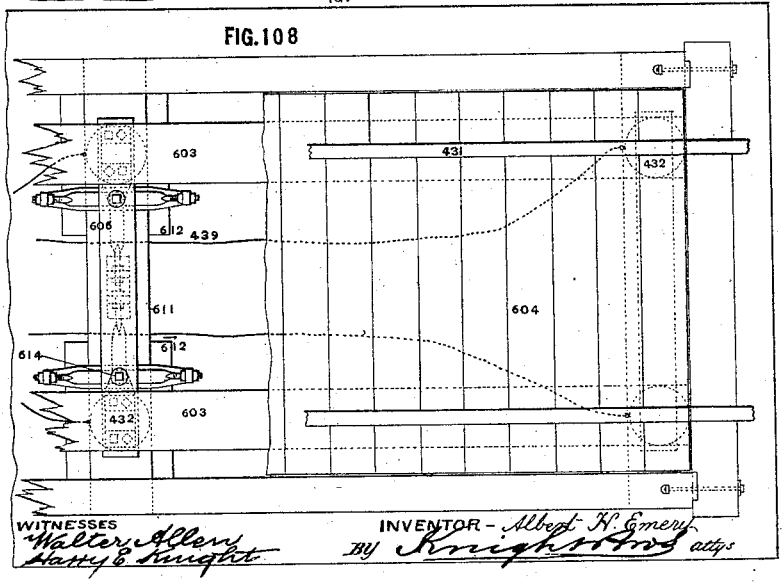

UNITED STATES PATENT OFFICE.

ALBERT H. EMERY, OF NEW YORK, N. Y., ASSIGNOR TO THE EMERY SCALE COMPANY, OF STAMFORD, CONNECTICUT.

WEIGHING MACHINERY.

SPECIFICATION forming part of Letters Patent No. 278,906, dated June 5, 1883.

Application filed February 5, 1881. (No model.)

*To all whom it may concern:*

Be it known that I, ALBERT H. EMERY, of the city, county, and State of New York, have invented certain new and useful Improvements in Weighing Machinery, of which the following is a specification.

The invention relates to scales in which the pressure is transmitted from the load platform or platforms to the weigh-beams through the medium of liquid contained in suitable chambers and pipes.

The invention will be described in its application to railway-track scales.

The liquid-supports are arranged at proper intervals beneath the platform, on which latter a railway-track may be mounted. The supports are preferably constructed with columns, each having a lower part fastened to the base and an upper part fastened to the surrounding shell or casing by means of diaphragms secured permanently to each. A central screw is inserted in the head to separate the parts when required. The column-head is surmounted by a gum or other spring surrounded by a rigid stay-ring, and the spring by a bell-shaped cap, on which the platform rests, the cap extending downward around the upper part of the shell to shelter the diaphragm and ring and keep water from the upper part of the case. The shell is fastened to the base by tap-screws inserted in countersinks and sealed to make the joints liquid-tight. From the supports the pressure is transmitted through liquid-pressure pipes to any necessary number of liquid-pressure reducers separate from the weigh-beam and its frame and connections, and from these reducers to paired liquid-pressure chambers, acting directly upon the column of the weigh-beam or on the column or columns of one or more intermediate pressure-reducers which transmit the pressure to the weigh-beam column. By the term "reducer" is meant an apparatus consisting of one or more pressure-columns mounted through the medium of flexible plates in a suitable casing, and receiving at one end the pressure from the platform-supports through the medium of one or more small liquid-chambers, which pressure is transmitted from the pressure column or columns through the medium of a liquid chamber or chambers of larger area, or suitably-arranged levers, so as to reduce it in any desired degree or proportion. In the primary reducers the small multiple pressure-chambers are secured to the base of the reducer by screws, and are each provided with a small pressure-chamber column resting on a diaphragm held at its periphery by a casing-ring, and surrounded and fastened to the base by a thin sealing-ring. The separate chamber-pieces are removable from the reducer-frame through a central opening in the base thereof, through which opening the pressure-pipes pass to each small chamber. The reducer-column is limited in its descent by stop-screws, which may be employed for fixing it in position for adjustment in filling the main liquid-chamber in the head of the reducer and for shipping. The main chamber is filled through a duct closed by a transverse screw-plug. The secondary reducers are constructed with equal paired chambers, the two chambers of each pair receiving liquid from branches of the same conducting pipe, and being so placed as to balance the pressure on opposite sides of the axis of the column against which they act. The tops of the small chambers are formed with diaphragms, either annular or continuous, held at their peripheries by clamping casing-rings—one for each chamber—all of which rings are held down by a single plate, through openings in which the small pressure-columns act on the main column. The said plate extends over the entire base of the reducer, and is secured thereto by screws or bolts. The bottom of each small pressure-chamber consists of an annular plate soldered to the upper diaphragm, and a central stem, to which the inner edge of the annular plate is fixed, and which receives the nozzle of the conducting-pipe. The base-stems of the small pressure-chambers are secured to the main base by fixing tubes or rings, through which the conducting-pipes pass.

The pressure-column of the weigh-beam is constructed in annular form, containing a central stem with an enlarged head resting on the annular column and receiving the beam-connections. The beam is constructed with an enlarged head, made hollow for the reception of balancing material. The main beam connects at its end with a secondary beam or indicator-rod having much greater angular motion.

The weights are of three kinds, to wit: first, sliding weights on the main beam and indicator-rod and on the weight-rods, attached to the former for balancing and for fractional weighing; second, suspension-weights arranged at different points in the length of the beam in sets or sections, supported on frames adapted by their vertical motion to apply and remove the weights in succession; third, one or more weights suspended from either end of the beam by suitable rods through the medium of conical seated attaching-nuts, and applied or removed by the vertical motion of a platform on which they are supported.

The sectional weight-frames, which require considerable range of vertical movement to apply or remove the whole set of weights, are operated by compound levers, to which are connected rods working in adjustable guides through friction-boxes in the frame to hold the levers in any position in which they are set. These fixing-rods carry indicators attached thereto by suitable stocks, and, in connection with graduated indicator-plates, show the number or value of the weights applied to the beam. To counterbalance the weight-supporting frame and the weights resting thereon, a weight is employed attached to an arm connected with the weight-frame through an eccentric pulley and strap, so as to produce a variable effect corresponding approximately with the weight to be counterbalanced.

The vertical movement of the beam is limited by adjustable stop-screws applied either to the said beam or to the case or frame thereof. The sliding weights are operated by sliding rods supported by studs on the scale-frame, and furnished with fingers for catching the weights. The indicator-rod is made in two parts with a screw connection, so that its free end may be made thin and light. Its extremity is furnished with a needle-point attached by a screw coupling or clamp. It is guided by a vertical standard secured to the weigh-beam or scale-frame by an adjustable holder, by which the said standard is set up or down to adapt it to limit the vertical motion of the indicator-rod as desired. The position of the indicator-rod is shown by a graduated plate secured adjustably to the weigh-beam or frame by an attaching-plate.

The entire beam-frame, with the beams, weights, and connections, is inclosed within a double case, the outer case being opened to give access to the operating-levers and to expose to view the weights and indicator through the glazed inner case, which contains and protects the working parts.

The platform used in connection with the scale may be of any suitable construction; but it is preferred to use the improved platform hereinafter described and claimed. This platform is removable and rests upon an independent load-frame fixed against horizontal motion by flexible stays, permitting its vertical play. The load-frame is bolted to rigid knee-plates interposed between it and the pressure-supports, the same bolts connecting it to flexible stay-plates. The latter are attached to rigid brackets projecting from the stationary bed-sills of the foundation by means of straining-nuts, which permit the horizontal adjustment of the platform either longitudinally or transversely. The removable platform is constructed in sections resting on the inmtermediate load-frame by metallic shoes and steps. The sections of the platform may be removed independently without disturbing the load-frame or supports.

In the accompanying drawings, the invention is represented by fifty-two views, numbered Figures 59 to 108, inclusive, and 217 and 218. Fig. 59 is a plan diagram of a portion of a railway-track with the platform omitted, showing the rails and the positions of the platform-supports, connecting pressure-pipes and intermediate reducers. Fig. 6 is a vertical section of a secondary reducer adapted to receive pressure from a number of intermediate or primary reducers and transmit reduced pressure to the beam-column. Fig. 61 is a plan of the base of the said secondary reducer, showing the small pressure-columns and one-half of the fixing-plate which encircles them and secures their casing-rings and diaphragms, as hereinafter described.

Fig. 62 is a vertical section of a primary reducer. Fig. 63 is a plan of the base of the primary reducer, showing some of the small pressure chambers and columns in position, and a portion of the annular main pressure-column and other parts. Fig. 64 is a vertical section of the base of the beam-supporting pillar and pressure-column, with a liquid-pressure chamber and its attachments. Fig. 65 is a vertical section of the same under a modified form, showing the combination of a reducer with a weighing-scale pillar base or gage. Fig. 66 is a horizontal section on the line 66, Fig. 64. Figs. 67 and 68 are vertical sections of reducers under modified construction. Fig. 69 is a plan of the same. Figs. 70 and 71 are elevations of the two ends of the scale-frame and beam. Fig. 72 is a vertical transverse section on the line 72, Fig. 70. Fig. 73 is a rear end view of the scale-frame, beam, and indicator attachments. Fig. 74 is a horizontal section of a portion of the frame on the line 74, Figs. 70 and 80. Fig. 75 is a plan view of the scale-frame and beam attachments without the beam. Fig. 76 is a plan of the beam. Fig. 77 is an elevation of the end weight with the supporting-platform thereof, and a portion of the operating-lever. Fig. 78 is a vertical section of the attaching-nut of said weight on a larger scale, showing the lower end of the suspension-rod in elevation. Fig. 79 is a front elevation of the weigh-beam case and its contained parts, with portions of the casing broken away to show the weight-operating levers. Fig. 80 is a vertical transverse section of the same on the line 80, Fig. 79. Fig. 81 is a horizontal section thereof on the line 81, Fig. 79, showing the beam and frame in plan. Fig. 82 is an elevation of parts of two of the sectional weights, the bars of the supporting-frame, and the suspending-beam rod on a larger scale. Fig. 83 is an elevation of the weight-indicator plate and indicators, also on a larger scale. Fig. 84 is a rear end view of the frame, beam, and attachments in modified form. Fig. 85 is a front elevation of the said rear portion thereof. Fig. 86 is a front elevation of the forward end of the frame-beam and attachments, also in modified form. Fig. 87 is a plan of said forward end thereof. Fig. 88 is a front elevation of the indicator-rod, its guide, indicator-plate, and attachments on a larger scale. Fig. 89 is a plan thereof, showing the guide-rod in horizontal section on the line 89, Fig. 88. Fig. 90 is an elevation, partly in section, of one of the friction-boxes of the weight-supporting frames. Fig. 91 is a plan of a portion thereof. Fig. 92 is a vertical section of a platform-pressure support. Fig. 93 is a plan of one-half thereof. Fig. 94 is a longitudinal section of a portion of a railway-track scale-platform and its supports and bracing devices on the line 94, Fig. 97. Fig. 95 is a plan of one end of the same, parts of the rails and planking of the platform being omitted. Fig. 96 is a plan of another portion thereof, with the rails and planking omitted, showing the end of one section of the removable platform. Fig. 97 is a transverse section on the line 97, Fig. 94. Fig. 98 is a transverse section, on a larger scale, of a portion of the platform and intermediate stay or load frame on the line 98, Fig. 99, showing a hydraulic-pressure support in elevation. Fig. 99 is a side elevation of the same parts with the front support removed. Fig. 100 is a side elevation of an intermediate portion of the platform-beams with its bearing plate or shoe, which rests on the load-frame. Fig. 101 is a plan view of the same parts. Fig. 102 is an edge view of a step for supporting the ends of platform-beams. Fig. 103 is a plan of the same. Fig. 104 is a front edge view of a shoe applied to the end of the beam. Fig. 105 is a plan of a pair of such shoes. Figs. 106, 107, and 108 illustrate a simpler form of load-frame and platform constructed in one. Fig. 106 is a longitudinal section on the line 106, Fig. 107. Fig. 107 is a transverse section on the line 107, Fig. 106. Fig. 108 is a plan of the same parts. Figs. 217 and 218 are detail sectional views, on a larger scale, of parts of a reducer-chamber and its connections, hereinafter described.

431, Fig. 59, may represent rails, which in practice rest on a platform of suitable construction. The platform is omitted in Fig. 59, in order to expose the subjacent parts. 432 are liquid-pressure supports, preferably constructed as shown in Figs. 92 and 93, in which 433 represents a stationary base, and 434 a shell or casing secured thereto by tap-screws 435, occupying countersinks in the base and passing into apertures which do not extend through the flange of the casing. After the insertion of the screws the cavities left beneath their heads are filled with a suitable cement or sealing material to make an air-tight and liquid-tight joint. The sealing material is also passed around in the joint between the base 433 and casing or shell 434. These screws clamp the shell or casing upon the outer periphery of an annular diaphragm, 436, which is formed with bent edges and connected by soldering or metallic packing, or any suitable means, to the base 433 and to the pressure-support column 437, which column and the annular diaphragm constitute together the top of the liquid-chamber, which is formed in the base 433, and communicates through the plug 438 and pipe 439 with a pressure-reducer, as hereinafter described. The bearing portion 437$^a$ of the column constitutes a removable head connected permanently by an annular flexible fixing-plate, 440, with the casing 434. A central screw, 441, in the removable head 437$^a$ affords facility for forcing it off from the other portion of the column when the parts are to be separated. The column is surmounted by a spring, 442, of rubber or other material, surrounded by a stay-ring, 443. On this spring rests a bell-shaped cap, 444, the downwardly-projecting flange of which covers and protects the working parts, and excludes water from the upper part of the casing. An aperture is made in the fixing-plate 440 to allow free passage of air under changes of temperature. The platform, in any necessary number of sections, rests on the caps 444 of the supports 432.

The pipes 439 have no connection with each other, but are carried separately from any suitable number of the pressure-supports, each to its own small pressure-chamber in a reducer, 445, preferably constructed as shown in Figs. 62 and 63, and consisting of an annular base, 446, a shell or casing, 447, a head or cap, 448, screw-bolts 449, connecting these parts, a two-part pressure-column, 450 450$^a$, and small pressure-chamber pieces 451, equal in number with the supports connected with the reducer. Each of the said pressure-chamber pieces is secured to the base by a screw, 452, and is surmounted by a small pressure-column, 453, connected by an annular diaphragm, 454, with the chamber base-piece 451, the outer edge of the diaphragm being clamped by a casing-ring, 455, and the joint protected by an encircling sealing-ring, 456. The main pressure-column 450 rests on all of the small columns 453. The annular form of the base 446 affords facility for introducing and removing the chamber-pieces, with their attached diaphragms, without uncoupling the pipes 439, which are permanently connected to the chamber-pieces by hollow plugs 457. The opening in the annular base is closed by a plate, 465, secured by screws 466.

449$^a$ represents a gage-screw, any necessary number of which are employed to fix the column in position when required for filling the upper liquid-chamber or for transportation, or when the small liquid-chambers are to be introduced or removed. The screws are so constructed that when screwed in till their heads strike the base 446 their ends form a gage, against which the base of the column may rest, leaving the diaphragms in normal position. The liquid-chamber at top is then filled under pressure. When the apparatus is set up for use the screws are retracted sufficiently to leave the column free. The top $450^a$ of the pressure-column is permanently connected by a diaphragm, 458, with the chamber-cap 448, and with this cap forms the liquid-chamber, from which reduced pressure is communicated through a pipe, 459, attached by a hollow plug, 460. This chamber is filled through a duct, 461, closed by a sealing-plug, 462. The pipe 459 from each primary reducer 445 is branched through a coupling, 463, Fig. 60, of any suitable construction, so as to communicate with paired chambers in the secondary reducer indicated in dotted lines at 464 in Fig. 59, and shown on a larger scale in Figs. 60 and 61. The base 467 of this reducer is provided with vertical openings, having shoulders 468 to receive the stems 469, which are held down by fixing tubes or rings 470, bearing upward against the said shoulders. These stems receive the fixing-plugs 471 of branches 472 of the connecting-pipes 459.

The stems 469 form each a part of the base of a small pressure-chamber, 473, annular plates $473^a$ being attached to said stems by their inner edges and to the chambered base of the reducer 467 by their outer edges. The tops of the chambers are formed by annular diaphragms $474^a$, connected to the small pressure-columns 474 and held down by casing-rings 475, on which rests a plate, 476, having openings for the passage of the small pressure-columns 474 and held permanently to the reducer-base by screws 477. The main pressure-column 478 of this reducer rests on the small pressure-columns 474, as before described, and at its top is formed a common liquid-pressure chamber, 479, which may be constructed in a manner similar to that already described in connection with the primary reducer, or as here shown, with two connected plates, 1380 1264, constituting a removable chamber, to which is soldered a coupling-plug, 1381, having a duct which communicates with the sealing-plug 1382. $449^b$ is a fixing-screw for use in shipment.

From the chamber 479 the liquid is conducted, with reduced pressure, by sealing-plug 1382 and a pipe, 480, either to a chamber, 481, at the base of the beam-column 482, as illustrated in Fig. 64, or to another reducer, 483, as illustrated in Fig. 65, if it is required to further reduce the pressure before communicating it to the beam-column 482. Figs. 67, 68, and 69 illustrate other modifications in the construction of the supplemental reducer, in which it is not attached to the base of the scale-frame, as illustrated in Fig. 65, but made separately therefrom. The modifications shown in Figs. 65, 67, 68, and 69 are more frequently used in connection with a gage for measuring liquid-pressure than with weights. In Fig. 67 the chamber 484 of the reducer is covered by a plate, 485, of compressible and flexible material instead of metal, as in the other illustrations.

486 represents the column of this supplemental reducer, and 487 the reduced liquid-pressure pipe for conducting the pressure to the chamber beneath the beam-column.

488 is the cap-plate of the supplemental reducer when made separately from the base of the beam attachments. When the normal pressure of the platform is insufficient to produce the proper initial pressure in the chambers and keep the parts in close contact, the reducers are reversed from the position shown in the detailed views Figs. 60 to 68, inclusive, taking the multiple pressure-pipes 472 at top and delivering through single reduced pressure-pipes 480 at bottom, as illustrated in Fig. 79. In this position the gravity of the main columns and that of the small pressure-columns act, in conjunction with the pressure of the liquid, to keep the bearings in close contact.

In Figs 64 and 65, 489 represents parts of the stationary scale-frame, to which the base 490 is connected by bolts 491. This scale-frame is preferably constructed with two horizontal flanges, 492 493, connected by a web, 494, as illustrated in Figs. 70 to 75, inclusive. From the upper flange rises a standard, 495, Figs. 70 and 79, forming the fulcrum-support of the beam 496, which is connected thereto by a thin flexible plate, 497, and by a thin flexible plate, 498, and clamp-plate, 499, with the enlarged head 500 of the central stem, 501, of the beam-pressure column 482. The stem 501 is rigidly secured within the column by a base-plate, 502, constituting a nut between which and the lower end of the annular column 482 is clamped a flexible fixing-plate, 503. The beam 496 is is formed with an enlarged head, $496^a$, which made hollow, as illustrated in Fig. 86, for the reception of molten metal or other material to form a counter-balance. From the rear end of the scale-frame rises a standard, 504, Figs. 71, 73, and 79, from which by thin flexible plates and clamp-plates (shown collectively at 505) is suspended the fulcrum-block 506 of an indicator-rod, 507, said fulcrum-block being attached by flexible plates and the clamp-plates 508 with the beam 496, near its rear or weight end. The details of these attachments are more fully described in other applications, as are also the horizontally and vertically adjustable sensitive weight and its standard 509, the sliding tare or balancing weights 510 511 512, weight-rod 513, one or more, and other accessories.

514 515, Fig. 79, represent a pair of stop-screws adjustable in the beam 496 and coming in contact with the flange 493 and shoulder 516, respectively, so as to limit the vertical motion of the beam. These screws may, if preferred, be screwed adjustably into the flange and shoulder or other stationary parts, so that the beam will come in contact with their heads with the same effect. At the rear extremity of the beam 496 is attached by flexible plates 517 a suspension-rod, 518, formed with a conical extremity, 518ª, as shown in Fig. 78, on which rests a nut, 520, for the attachment of a weight, 519, Figs. 77, 79. Fig. 86 shows a similar weight, suspended from the load end of the beam, so as to be removed to balance a load on the platform. The space shown at 521 in Fig. 86, between the top of the weight within the nut and the lower end of the rod 518, allows the necessary vertical play for the removal and application of the weight. Each of these weights is removed and applied by the vertical motion of a platform, 522, working in a guide, 523, and operated through a link, 524, Figs. 77, 79, by a lever, 525, which is fulcrumed on a bar, 526, threaded at its upper end, and provided with a pair of nuts, 527 528, Fig. 77, for clamping it adjustably to the lower flange, 492, of the frame. In the present illustration the large weight 519 is supposed to represent a value of one million pounds. It is applied at the ordinary weight end of the beam, as illustrated in Fig. 79, or at the load end, as illustrated in Fig. 86, being operated by a platform, 522, and lever 525 in either case. When used at the weight end of the beam its weight is applied to the beam by the lowering of its platform to balance a load. When it is applied to the load end the same effect is produced by lifting the weight from the beam, the scale having been previously balanced with the weight on. An indicator-rod, 530, Figs. 79, 83, shows, by its pointer 530ª and the figures on the indicator-plate 529, when the million-pound weight is counteracting a load on the platform by its application to or removal from the beam, as the case may be.

532 533 534 represent weight-rods suspended from the beam at different points, and provided with flanges or collars 535 for receiving each one of a vertical series of weights, 536 537 538, which, when not applied to the beam, are supported by conical collars 539 on vertically-moving weight-frames 540 541 542, operated by compound levers 543 544 545, connected at one end by links 546 with the said weight-frames 540 541 542 and at the other end by links 547 with fixing-rods 548 549 551.

552 represents a pair of rods suspended from the load end of the beam by a thin-plate connection, 553, as shown in Figs. 79 and 80, constructed with conical collars 554, each supporting one of a series of weights, 555, which in their normal position are thus suspended from the head of the beam, while the scale is balanced without a load to be weighed.

To remove any necessary number of the weights 555 corresponding with the load to be weighed, a vertically-moving central rod, 556, Fig. 80, is employed, said rod being provided with collars 557 at such distances asunder that the said rod will, by a vertical movement, lift the weights 555 in succession from the suspending-beam frame 552 in the same way and with the same effect as a downward movement of the weight-frame at the weight end of the beam causes a successive deposit of their weights on the suspension-rods. The weight-supporting rod 556 is connected by a link, 558, with a compound operating-lever, 559, 560, Fig. 79, and this by a link, 547, with the fixing-rod 550.

543ª 544ª 545ª 559ª represent the fulcrum-brackets of the respective levers 543 544 545, 559. The lever 560 is fulcrumed in the lower end of the bracket 543ª. All these fulcrums are connected adjustably to the frame.

The weight-supporting rods 540 541, &c., may be guided in plates 542ª, Figs. 84 and 85, secured adjustably to the flanges 492 493 of the frame by screws 541ª, so that the weights may be adjusted concentrically to the suspension-rods from the beam.

The links connecting the operating-levers and weight-frames may be applied singly, as illustrated in Figs. 79 and 80, but are preferably paired, as illustrated at 546 in Figs. 84 and 85. The links 546 are connected with the weight-frame 542 by a pin, 624, of such length that when the washers 625 are pressed firmly against the ends thereof by screws 626 the links will be held firmly in position, but will not be clamped. The lower ends of the links are secured by a similar pin, 624, screws 626, and washer 625. This pin 624 is set in a pin, 627, of larger diameter, forming shoulders to prevent the links bearing against the lever. The pin 627 has an adjustment in the lever 545, and is fixed in position by a set-screw, 628, in order to set the lever in proper position relatively to the links, so as to avoid lateral strain on the links, and thus avoid lateral strain on the weight-frame.

The ten-thousand-pound weights 555 may, if preferred, be transferred to the other side of the beam-fulcrum in the space 555ª, Fig. 79, to the right of the second set of weights.

Hand-levers 561 562 563 564 565, Figs. 79, 80, and 81, are connected by links 566 with the respective fixing-rods 548 549 550 551 530 of the weight-levers above described, so as to enable the operator to work the levers and lift the said weights with ease. Pointers 548ª, 549ª, 550ª, 551ª, and 530ª, attached to the respective fixing-rods, indicate by figures on the plate 529 the value of the weights hanging upon or removed from the beam, as the case may be, as illustrated in Fig. 83.

In order to hold the fixing-rods securely in any position in which they may be set while supporting the weight-frames and any necessary number of the weights through the medium of the operating-levers, friction-boxes 567 are employed, preferably constructed and applied as illustrated in Figs. 90, 91, 86, and 87. The box is made in two parts, 567 568, screwed one within the other, and each having a flange, so as to embrace the flange 492 or 493 of the frame. Slots or large holes 569 are provided in the flanges of the boxes 567, for the reception of screws 569ª, by which the boxes are clamped adjustably to the flanges 492 493.

Radial holes 570 are provided in the flange of the other member, 568, of the box for the reception of an instrument by which the lower part of the box is screwed within the other. The upper member is formed with a groove or recess, 571, to receive a fillet of leather or other suitable packing material, which, by screwing the part 568 into the part 567, is pressed in contact with the rod with the required force to prevent it from being moved by the gravity of the weights, frames, and levers. As a further means of holding the weights in position, the levers which operate the heaviest of the multiple weights, or, if necessary, every set of said weights, are connected with a counterbalance-weight, 531, Figs. 84 and 85, which is constructed hollow, as shown, so that it may be made of the proper gravity, and is connected by hanging links 572 with an arm, 573, projecting from an eccentric drum, 574, to which is attached a flexible metallic band, 575, connected at its lower end with the weight-lever 545, for example. This drum turns on an axis, 623, having its bearings in a bracket, 576, which is connected permanently to the frame and projects downward on each side of the lever 545, receiving guide-screws 577, which, when the lever is adjusted in its proper working position, are turned up sufficiently to bear lightly on the said lever in order to guide it in its vertical motion without undue friction.

It will be apparent that from the eccentricity of the drum 574, as well as the motion of the arm 573, the outer end of the lever 573-574, to which the weight 531 is applied, increases in length while the load end, to which the weight-lever 545 is connected, decreases in length as the said lever 545 rises and the weight 531 descends. This gives the counter-balance increasing force as the weights are lifted in succession, so that the power of the counter-balance may correspond with the gravity of the parts to be balanced.

The compound levers may be dispensed with and all the weight-frames operated directly by single levers, as described in another application. Compound levers are adopted in the present case to bring their indicators together in connection with a single indicator-plate, and to bring all their handles within convenient reach of the operator in his position in front of the said indicator-plate.

The pointers 548ª, &c., are preferably attached to the indicator-rods through the medium of separate holding-rods 578, as shown in Fig. 86, screwed into the upper ends of the fixing-rods, so as to be readily adjustable vertically to regulate the height of the pointer. The pointer then consists of a needle passed transversely through the holder 578, near its extremity, and held by a set-screw, 579.

The construction of the multiple weights and their suspension-rods and supporting-frames is illustrated in detail in Fig. 82, where 538ª 538ᵇ represent parts of two adjacent weights, 534 being the suspension weight-rod attached to the beam, and 542 the two vertical bars of the weight-supporting frame. These weights are each made in two parts to admit of applying them to their supporting-frames and suspension-rods, as shown. The two parts are connected together by screw-dowels 6031, Figs. 84, 85, and by screws 6041 of common construction. The holes for the dowel-screw 6031 being first made and the dowels inserted, the holes for the screws 6041 are then finished and tapped, so that the two parts of the weight are held accurately in their proper relative position to receive the screws 6041, which secure them firmly together. After this the recesses and shoulders are made to receive the weight-frames and suspending-rods.

The indicator-rod 507 is preferably constructed in two parts, the free end 507ª being made small and light, as shown in Fig. 88, (where it is greatly shortened for convenience of representation,) and attached to the stock or butt 507 of the rod by a coupling-piece, 580.

The indicator-rod is provided with a needle-point, 581, secured in its extremity, as shown.

582 in Figs. 88 and 89 represents a guide-piece fixed to the indicator-rod by a screw, 583, and working over a guide-rod, 584, which is screwed into a guide-holder, 585. The holder 585 is screwed in a plate, 586, which is attached adjustably to the beam 496, or to the stationary frame, if preferred, by screws 587, occupying openings of larger diameter in said plate 586, as indicated by dotted lines in Figs. 88 and 89, so that the parts may be accurately adjusted as required. The upper stop, 588, of the indicator is set up or down by screwing the guide-rod 584 within its holder 585. The lower stop, which is formed of the head 589 of said holder, is adjusted vertically by screwing the holder up or down in the plate. The graduated indicator-plate 590 is screwed to the plate 586, as shown.

591 and 592, Figs. 79, 80, and 81, are graduated weight-bars attached to the beam 496, carrying weights 593 and 594, the larger being employed in the present illustration for indicating hundreds of pounds up to ten thousand, and the smaller for single pounds, up to one hundred. For operating these weights sliding rods 595 596 are employed, provided with fingers 597. These rods pass through the case 599 600, and preferably have their bearings in standards 598, erected from the flange 493 of the scale-frame, as shown in the example of the rod 595, instead of in the case, as shown at 596 in Fig. 79.

599 is an inner casing inclosing the beams and their supporting parts and accessories, with the weights and the devices for operating the same, with the exception of the handles of the hand-levers, which project out in front, as shown in Figs. 80 and 81. This inner case is provided with a glass front at 601 to expose the scale-beams and weights to view. It will appear that the means described for operating the weights by hand-levers and sliding rods obviates all necessity for opening the inner case in the ordinary use of the scale. The outer case, 600, is employed to completely inclose the glass front and the operating levers and rods, small shutters 602 being provided in said outer case to allow the sliding of the rods 595 596 when in use, and to cover their ends when the scale is closed for security.

The scale-frame may rest on beams 629, as shown in Fig. 80; but it is preferred to construct the frame as shown in Fig. 86, the flanges 492 493 being connected at their extremities and bolted in supporting-recesses in the side posts of the case 600.

The construction of the platform is shown in Figs. 94 to 108, inclusive.

603 represents sectional string-pieces supporting transverse planking 604, on which the rails 431 are fixed. The stringers 603 rest on transverse beams 606 through the medium of cast-iron shoes 607, secured to the ends of the string-pieces 603 by bolts 608, Fig. 99, as may be necessary. These shoes may be variously constructed, according to the position in which they are placed and according to the capacity of the scale or the severity of the wear and tear to which it is subjected. The string-pieces or longitudinal beams 603 are made in sections of any convenient length. Fig. 94 shows a section extending across two spaces between the supports hereinafter described. The shoes 607, when applied to the ends of the beam-sections, are preferably constructed as shown in Figs. 99, 104, and 105, each shoe having the form of an angle-piece, secured by horizontal and vertical bolts 608, as indicated by dotted lines in Fig. 99. The said shoes are made in pairs, as represented in Fig. 105, each with two or more toes projecting into the spaces between those of the other, so that both may transmit their loads to the center of the support.

The shoes rest on cast-iron steps 609, bolted to the transverse beams 606, which, through the medium of plates 617, hereinafter described, rest on the liquid-pressure supports 432, communicating, through the pipes 439, with the reducers hereinafter described. The supports rest on sills or sleepers 611, which may be supported by masonry 612.

To stay the platform against horizontal motion and to prevent the tipping of the cross-beams 606 by the bending of the main load-beams 603, longitudinal beams 613 are secured to the transverse beams 606 of the platform by bolts 614, which also fix thereto the stay-plates 615 616 and bracket or knee-piece 617. These parts are constructed and applied as follows: The knee-piece 617 consists of a rigid casting secured by bolts 618 to the beam 606, where it rests upon the support 432, extending downward in the shape of a rigid knee beneath the stay-beam 613, into the under side of which it is notched, and there secured by the bolts 614, as before stated. The longitudinal flexible plate 615, which is held at its center by the same bolt, 614, is secured at its extremities by nuts 619 to the ends of rigid brackets 620, which are fastened by bolts 621 to the bed-sill 611. The transverse flexible plates 616, Figs. 97 and 98, are likewise held by the bolt 614, and at their inner ends are fixed by nuts 622 to brackets 623, secured to the bed-sill 611 by bolts 630.

The longitudinal beams 603 of the platform are secured to the load-frame against longitudinal motion by rods 631, Figs. 94, 99, fixed to the knee-pieces 617 by nuts 632, and to brackets 633 on the beams by nuts 634. The lateral motion of the platform-sections on the intermediate load-frame is checked at the ends of the beams 603 by lugs 635, Fig. 102, projecting upward from the steps 609, and acting against flanges on the shoes 607. At the intermediate supports the longitudinal beams have shoes 610, constructed with lugs 637, near each end, extending into recesses in the beam to fix them against lateral motion on the beams. These shoes rest on steps 638, flanged at each end to hold the shoes and beams against lateral motion.

By the flexible plate connections 615 616 to the intermediate frame, 613, the platform is secured against horizontal motion, and enabled to resist traction and longitudinal shocks and strains from locomotives and trains, while its free vertical motion for weighing purposes is not restrained. The longitudinal beam 613 and transverse beams 606, with their connections, will be seen to constitute an independent load-frame interposed between the platform 603 604 and its supports 432.

By constructing the platform in sections, with their ends resting on the transverse supporting-beams 606, as above described, and as particularly illustrated in Fig. 99, a platform consisting of the longitudinal beam 603 and the planking 604 and rails 431, secured thereto, may readily be removed in sections, as required, without disturbing the intermediate load-frame, its connections, and supports.

The supports 432 are arranged opposite each other in pairs, as illustrated in Figs. 59, 95, 96, and 108, one pair being placed beneath each transverse beam 606. The pressure-pipes 439, from the respective supports of each pair, are conducted to chambers arranged opposite each other in the reducer 445, as shown in Fig. 59. The removable platform-sections may be made only long enough to span the space between one pair of supports and the next; or they may be adapted to stretch across two spaces, as illustrated in Fig. 94, or more than two spaces, if desired.

For platform-scales of small capacity, or where the wear and tear are not so severe, the transverse beams 606 may be permanently bolted to the longitudinal string-pieces 603, and rest directly on the tops of the pressure-supports or on interposed flat plates bolted thereto. By straining the plates 615 in either direction by means of the nuts 619 the entire platform may be adjusted or moved longitudinally; or by straining the plates 616 by means of the nuts 622 it may be adjusted laterally as required.

The weigh-frame and attachments will be seen to constitute an effective and superior standard gage for measuring liquid-pressure. Liquid being employed to transmit the pressure, it is immaterial whether the pressure represents units of weight or units of pressure area. Where the pressure is large, an intermediate reducer such as shown in Fig. 68 may be interposed, or where the pressure is very large a reducer such as shown in Fig. 67.

Gages of more simple construction are described in other applications.

Whatever novel subject-matter I have set forth and not claimed or attempted to claim herein I have claimed or attempted to claim in other applications, or have reserved to be claimed in future original applications.

The following is claimed as new:

1. In a hydraulic-pressure support, a pressure-column secured to its base by means of an annular diaphragm, substantially as herein set forth.

2. In a hydraulic-pressure support, a pressure-column centered within a surrounding shell or casing by means of an annular diaphragm secured permanently thereto and to the chamber-base, substantially as set forth.

3. In a hydraulic-pressure support, a pressure-column made in two parts, one secured to the base and the other to the surrounding shell or casing.

4. In a hydraulic-pressure support, a pressure-column made in two parts, with a screw, 441, for separating them, as set forth.

5. In a hydraulic-pressure support, the combination of the base 433, casing 434, countersunk tap-screw 435, and the tapped socket extending only partially through the flange of the casing, so as to admit of forming a tightly-sealed joint, substantially as set forth.

6. The combination of the removable cap 444 with a hydraulic-pressure support, substantially as described.

7. In combination with a hydraulic-pressure support, the bell-shaped cap, of cast-iron or other suitable material, constructed substantially as described, to adapt it to exclude water from the upper part of the case and protect the moving parts.

8. In a hydraulic-pressure support, the combined cap 444, rubber 442, and pressure-column 437, substantially as and for the purposes set forth.

9. In a hydraulic-pressure support, the combination of the cap 444, rubber 442, and retaining-ring 443 with the pressure-column 437, substantially as set forth.

10. In combination with one or more simple or compound hydraulic-pressure supports, one or more reducers through which pressure on the support is transmitted to the weigh-beam, substantially as described.

11. The reducer constructed substantially as herein described, with a base, 446, one or more small pressure-chambers, main pressure-column 450, case 447, and chambered cap 448, suitably connected by screws or bolts 449.

12. The combination of the sealing-ring 456 with the chambered piece 451, diaphragm 454, ring 455, and small pressure-column 453, as and for the purposes set forth.

13. In combination with the main receiving-chamber base 446, the small chambered pieces 451, each secured in position by a screw, 452, substantially as set forth.

14. The combination, with the base 446 and pressure-column 450, of one or more gage-bolts, 449$^a$, substantially as and for the purposes set forth.

15. The combination, with the base of a pressure-column or reducer, of one or more small pressure-chambers separable therefrom without the disconnection of their pipes, substantially as explained.

16. The annular base 446, adapted to permit the removal of the small pressure-chamber, substantially as described.

17. The combination, in the chambered cap 448, of the feeding-aperture 461, sealing-plug 462, and pipe-screw 460, substantially as and for the purposes set forth.

18. The combination, with the pressure-column 478 of a scale or reducer, of the small pressure-columns 474 and chambers 473, arranged in pairs, with a single pipe connecting with both chambers of each pair for the purpose of equalizing the pressure, substantially as set forth.

19. In combination with the base 467, the annular diaphragms 474$^a$, the small pressure-columns 474, and the rings 475, the plate 476, secured to the base by screws 477 or otherwise to hold the said rings in position, substantially as set forth.

20. The combination, with the base 467 of a reducer, and the pressure-chamber stem 469, of the fixing-tube 470, substantially as and for the purposes set forth.

21. A gage or scale reducer secured to the base of a weigh-case, in combination with a pressure-column, substantially as set forth.

22. The combination of the annular pressure-column 482, the central stem, 501, constructed with an enlarged head, 500, for the attachment of the beam-connection, and the base-plate 502, securing the annular column and the stem together and clamping the flexible fixing-plate 503.

23. A scale-beam, 496, constructed with an enlarged head, 496$^a$, made hollow for the reception of balancing material, as set forth.

24. The construction and combination of the weight 519 with conical seating attaching-nut 520 and the flanged suspension-rod 518 518$^a$, substantially as set forth.

25. The combination of the elevating-platform 522 with the weight 519 and suspension-rod 518 518$^a$, constructed and operating substantially as set forth.

26. In a weighing-machine, the combination of a weight-elevating bar, frame, or platform and primary and secondary levers with suitable connections for operating the same, substantially as set forth.

27. The combination, with a weight-supporting bar or frame and a lever or levers for operating the same, of a fixing-rod attached independently to the lever or levers, substantially as set forth.

28. The combination of the index 530ª with the fixing-rod 530, with or without the intermediate holder, 578.

29. Two guiding and sustaining friction-boxes, in combination with a bar attached to a weight-operating lever, substantially as set forth.

30. The combination, with a flanged weigh-beam frame, of friction-boxes 567 568 and a bar or rod connected directly or indirectly with the weight-operating levers, substantially as and for the purposes set forth.

31. The adjustable guide-plates 542ª, in combination with the flanges 492 493 and weight-supporting frames 540, substantially as and for the purposes set forth.

32. In combination, with a scale-beam, a pair of adjustable stop-screws, 514 515, applied either to the said beam or to the case or frame to limit the motion of the beam in either direction.

33. The combination, with the weight-supporting frame or its lever, of the variable counterbalancing-weight 531, substantially as set forth.

34. The combination of the drum 574, band 575, arm 573, and suspended weight with the weight-frame 542, substantially as and for the purpose set forth.

35. In a weighing-scale or pressure-gage, the indicator-rod 507 507ª, constructed in two parts with the coupling-piece 580, substantially as set forth.

36. In a weighing-scale or pressure-gage, the combination of the indicator-rod 507 and the needle-point 581, as set forth.

37. The combination, with the indicator-rod, of the guide-rod 584 and guide-piece 583, substantially as set forth.

38. The combination of the adjustable guide-holder 589, the guide-rod 584, and the guide-piece 582, as described.

39. The adjustable attaching-plate 586, in combination with the indicator-plate 590 and guide-holder 589, as set forth.

40. The weight-adjusting rods 595 596, or either of them, in combination with the holding-studs 598 and flange 493 of the frame, as set forth.

41. The double weigh-beam case 599 600, constructed substantially as and for the purposes set forth.

42. In a platform-scale, an independent load-frame fixed against horizontal motion, placed under the load-platform and resting on the weighing levers or supports.

43. The construction of the intermediate load-frame, as herein described, with longitudinal stringers 613 and transverse ties 606, held against longitudinal motion by stay plates or rods 615, substantially as and for the purposes set forth.

44. The connecting-knees 617, in combination with the string-pieces 613, cross-ties 606, and stay-plates 615 616, substantially as and for the purposes set forth.

45. The combination, with a hydraulic-pressure support, of the intermediate load-frame fixed against horizontal motion, and the separate load-platform, substantially as and for the purposes set forth.

46. A flexible plate or rod with suitable straining devices, combined with the load frame or platform and the frame or bed of a platform-scale for the purpose of adjusting and fixing said load frame or platform against horizontal movement, substantially as set forth.

47. The combination, with a load frame or platform, of the longitudinal flexible fixing plate or rod 615, nuts 619, bracket 620, and bed or sill 611, substantially as and for the purposes set forth.

48. The combination of the load frame or platform, transverse flexible fixing plate or rod 616, nuts 622, and bed-frame 611 623, substantially as and for the purposes set forth.

49. The combination of the steps 609, knee-pieces 617, stringers 613, and transverse beams 606, substantially as set forth.

50. The shoes 607, applied to the ends of the platform-beams 603, and employed in combination with the steps 609, substantially as explained.

51. In a railway-track scale, a load-platform made in sections resting by their ends independently on the platform-supports, substantially as set forth.

ALBERT H. EMERY.

Witnesses:
MAHLON RANDOLPH,
O. C. WOOLSON.